(12) United States Patent
Chun

(10) Patent No.: US 7,992,345 B2
(45) Date of Patent: Aug. 9, 2011

(54) METHOD FOR THE AFFORESTATION OF THE RECALCITRANT LAND

(75) Inventor: Su-Kyoung Chun, Chuncheon-si (KR)

(73) Assignee: KNU Industry Cooperation Foundation, Gangwon-Do (KR)

( * ) Notice: Subject to any disclaimer, the term of this patent is extended or adjusted under 35 U.S.C. 154(b) by 190 days.

(21) Appl. No.: 12/383,973

(22) Filed: Mar. 31, 2009

(65) Prior Publication Data

US 2009/0241416 A1 Oct. 1, 2009

(30) Foreign Application Priority Data

Mar. 31, 2008 (KR) .......................... 10-2008-0030025
Jul. 15, 2008 (KR) .......................... 10-2008-0068779

(51) Int. Cl.
*A01G 1/00* (2006.01)
(52) U.S. Cl. ........... 47/65.7; 47/47; 47/73; 47/74; 47/77

(58) Field of Classification Search ................. 47/73, 74
See application file for complete search history.

(56) References Cited

U.S. PATENT DOCUMENTS

| 3,755,962 A * | 9/1973 | Walters et al. ............. 47/73 |
| 3,923,729 A * | 12/1975 | Clendinning et al. ...... 47/74 |
| 4,333,265 A * | 6/1982 | Arnold ....................... 47/74 |
| 4,336,669 A * | 6/1982 | Gordon ....................... 47/74 |
| 4,347,686 A * | 9/1982 | Wood .......................... 47/73 |
| 6,516,565 B1 * | 2/2003 | Fima ............................ 47/74 |
| 2009/0241416 A1 * | 10/2009 | Chun ........................ 47/65.7 |

* cited by examiner

*Primary Examiner* — Francis T Palo

(57) ABSTRACT

The invention provides methods for afforestation of recalcitrant land comprising the steps of preparing multiplicity of vegetation containers made of natural wood and having a thickness of 3-8 mm; growing plant seeds in a soil composition composed of sprouting promoter, rooting promoter, fertilizer and peat moss to obtain plant seedlings; placing the plant seedlings into the multiplicity of vegetation containers and airdropping the multiplicity of vegetation containers containing the plant seedlings onto the recalcitrant land.

5 Claims, 9 Drawing Sheets

[Figure 1]
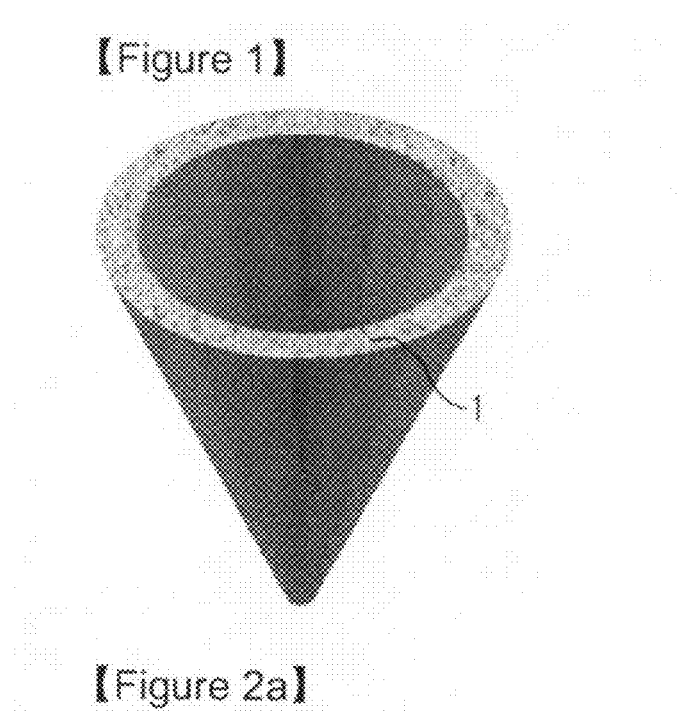
[Figure 2a]
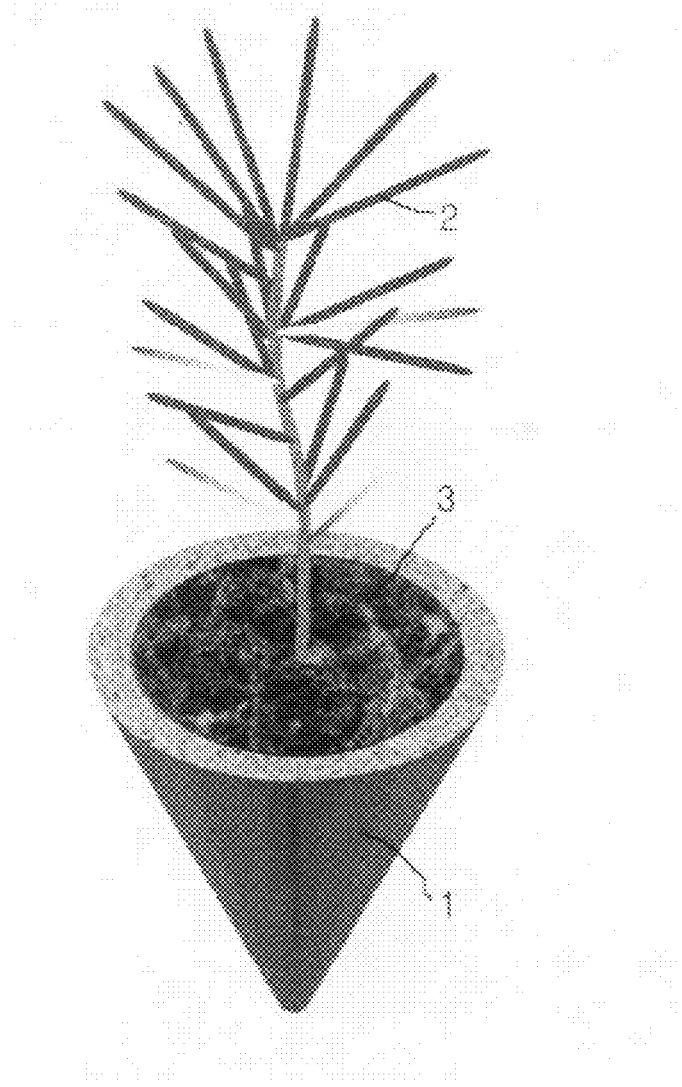

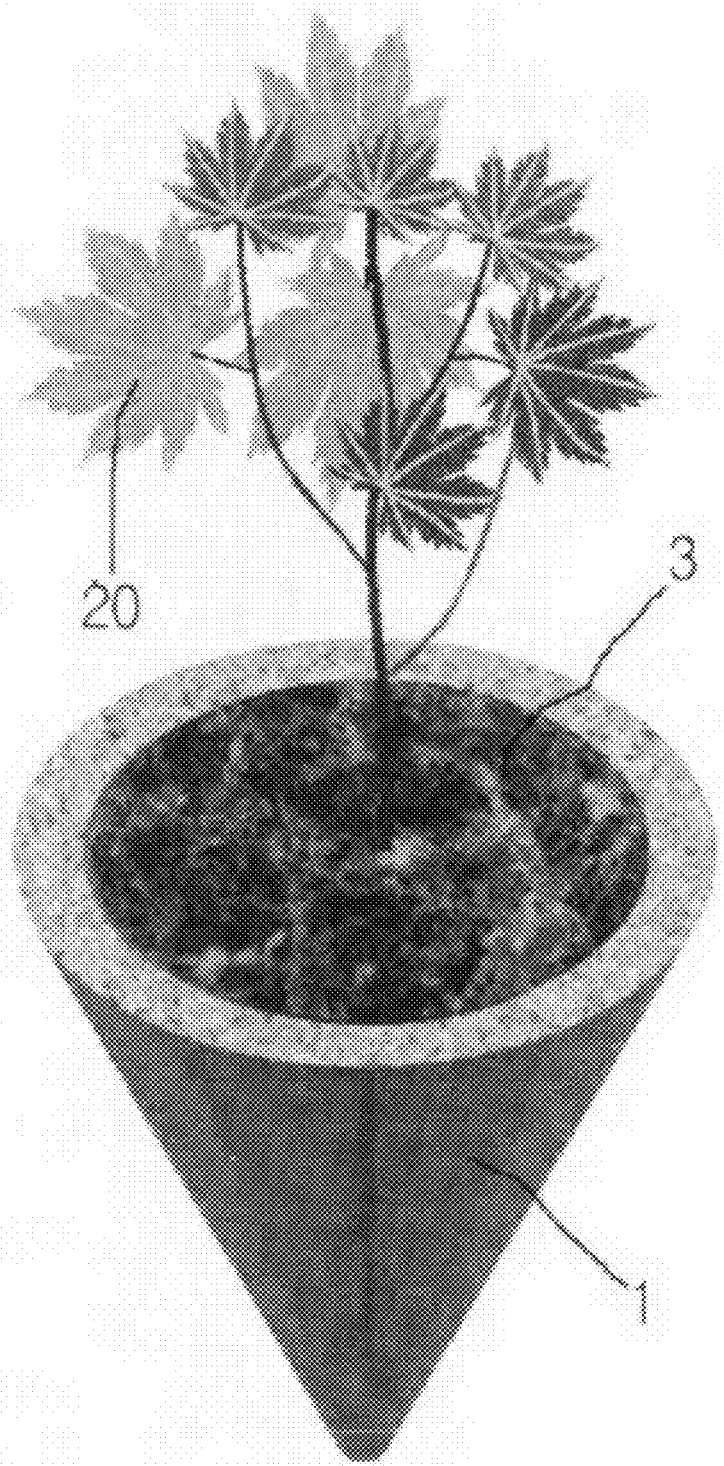
[Figure 2b]

[Figure 3]
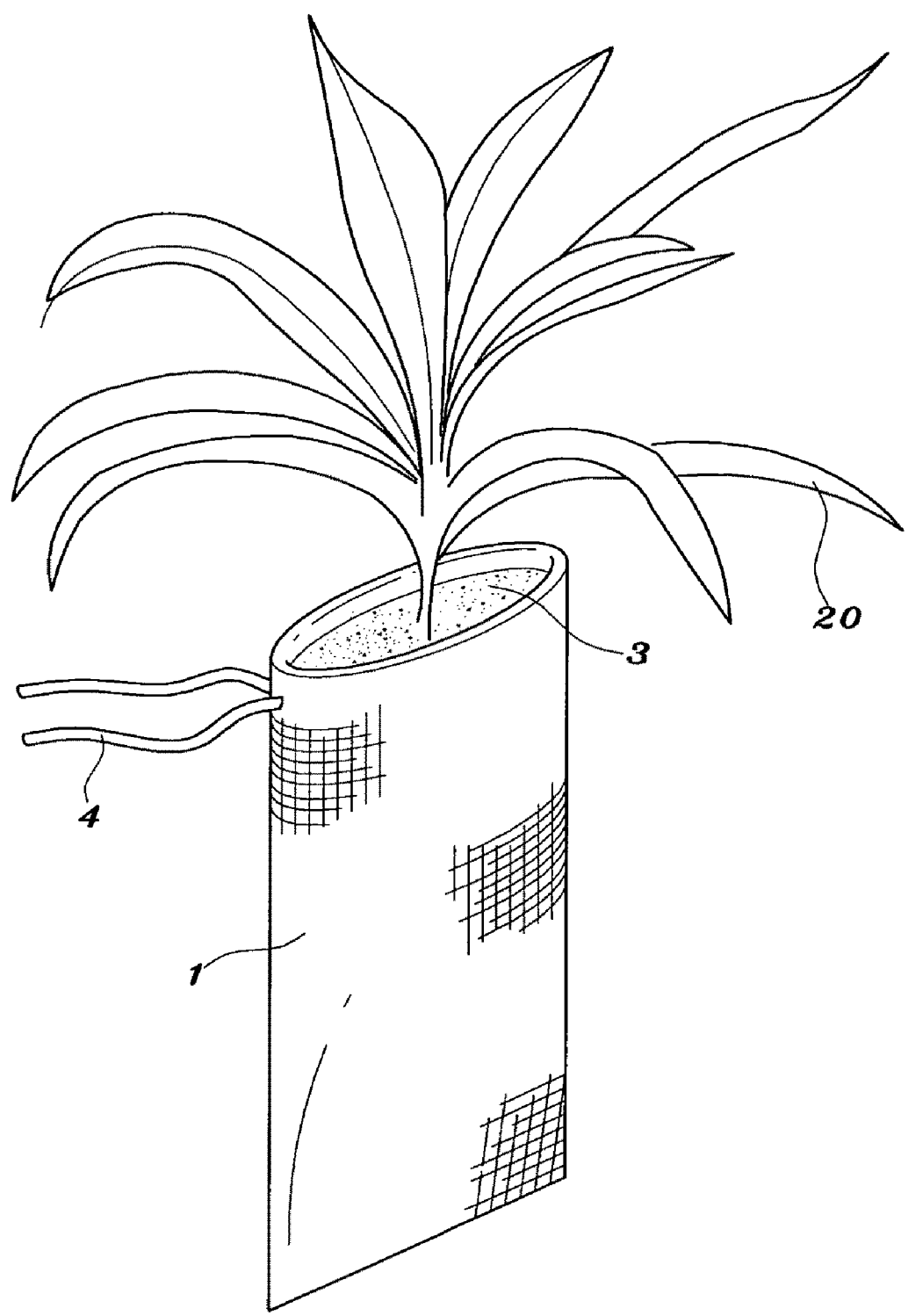

[Figure 4]
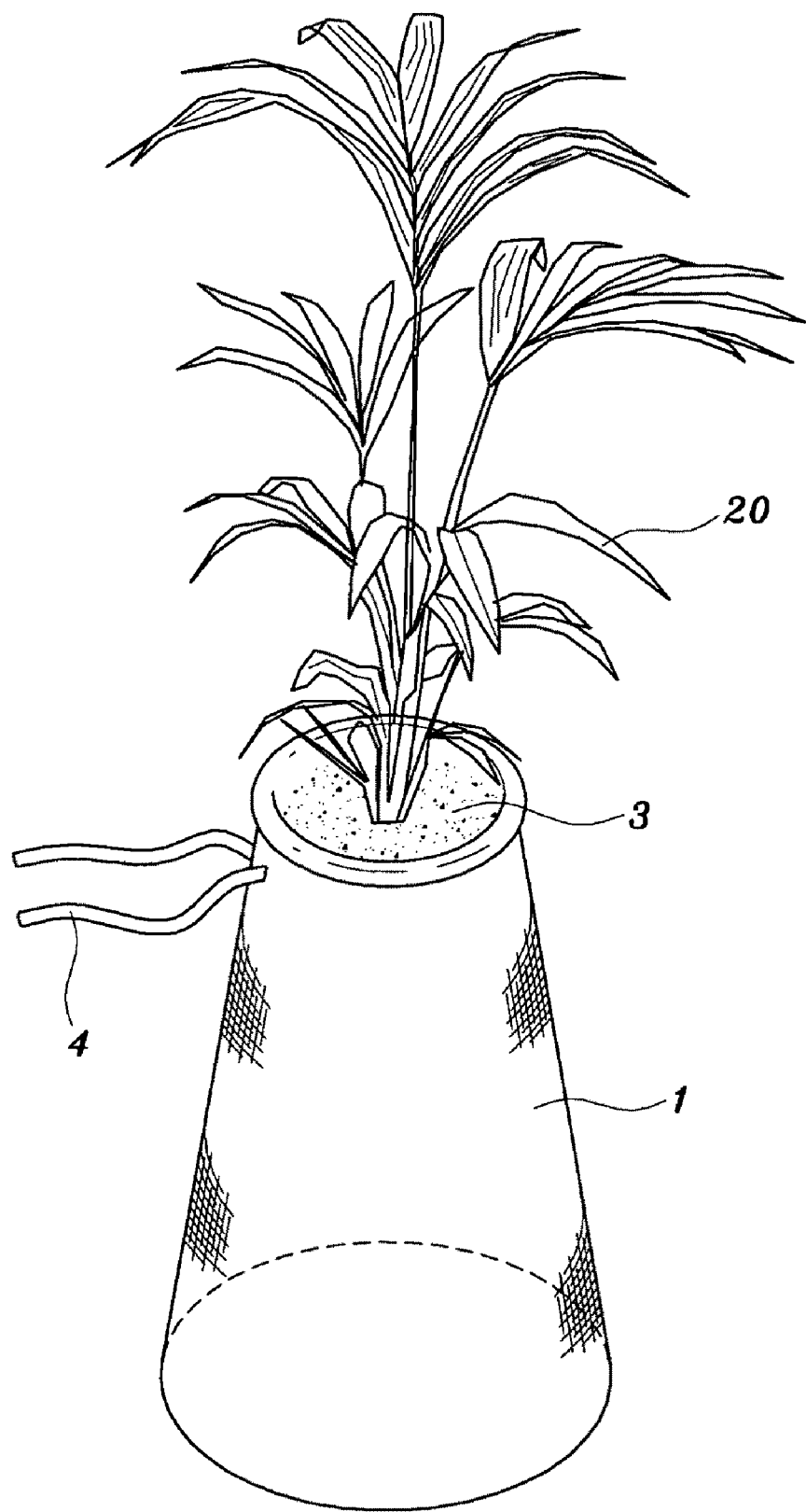

[Figure 5a]
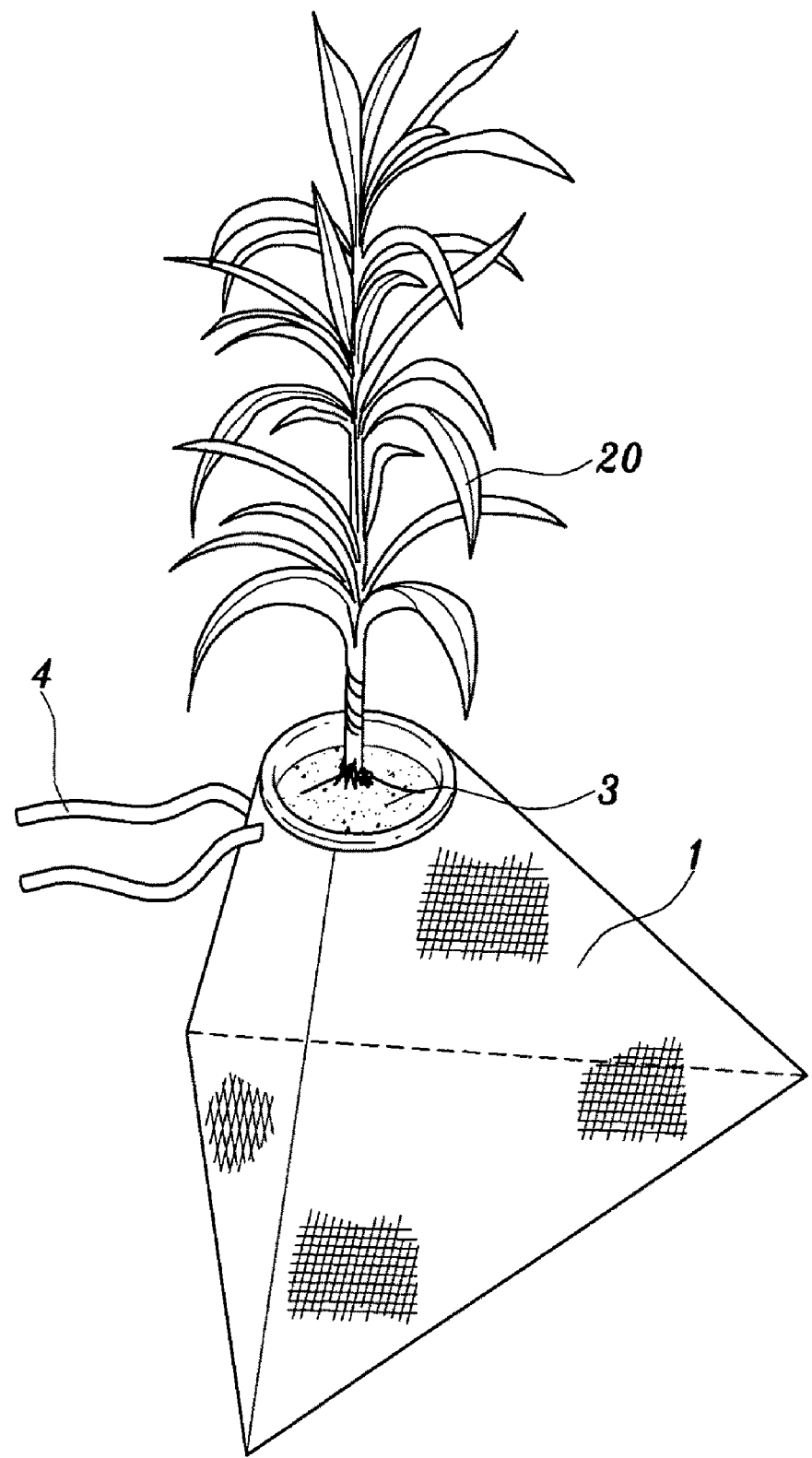

[Figure 5b]
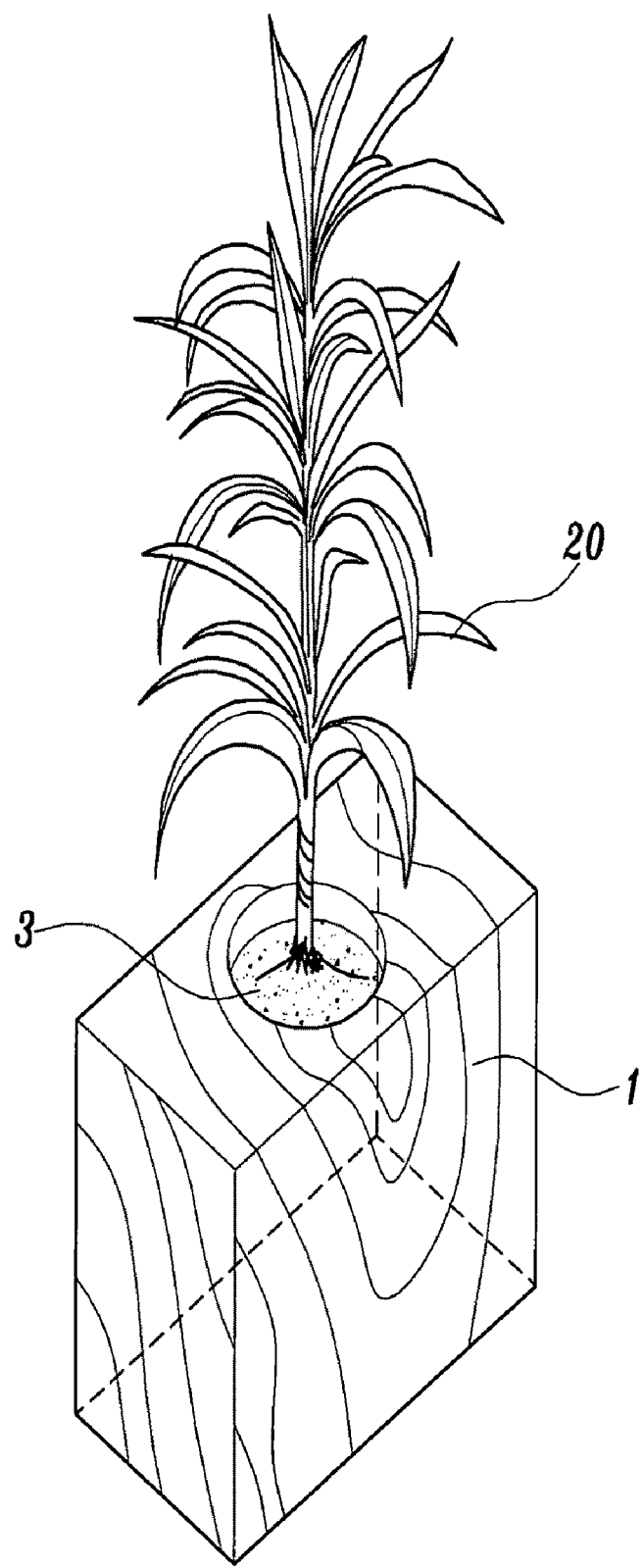

【Figure 6】
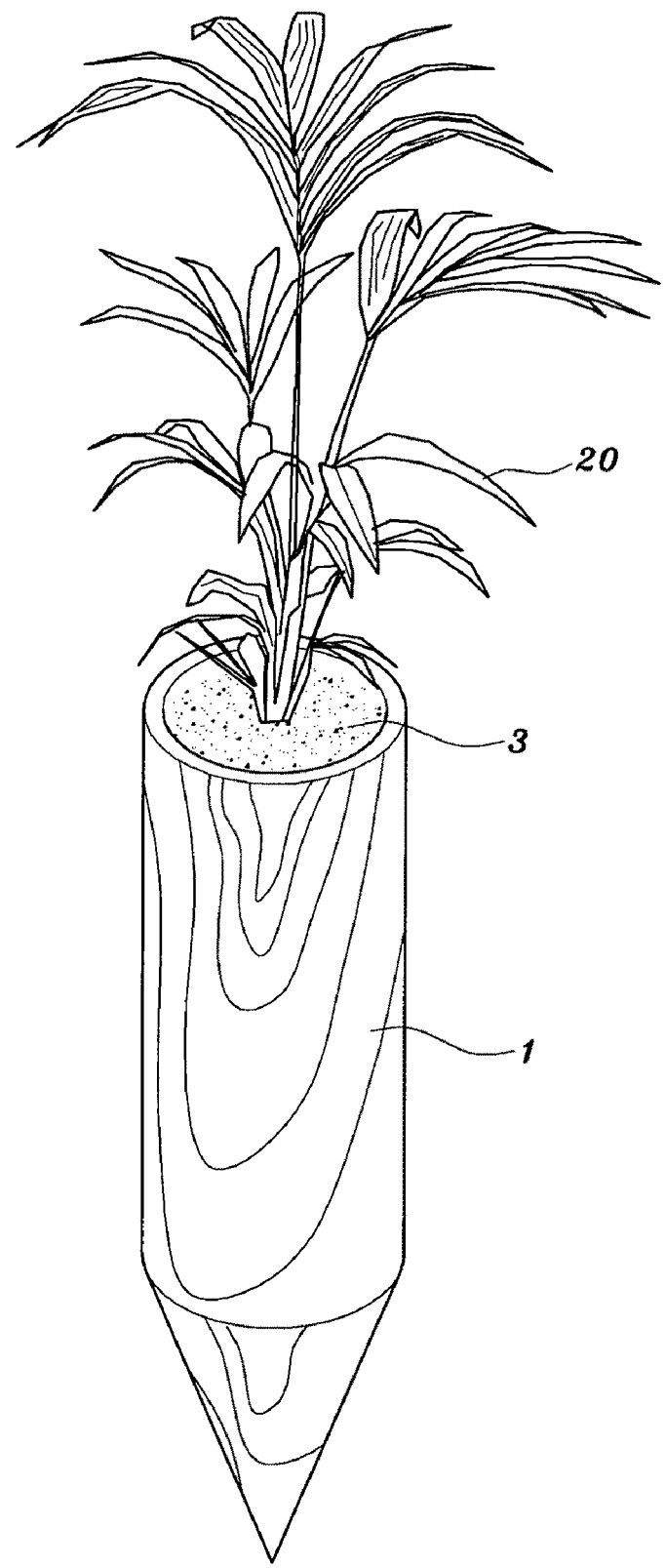

【Figure 7a】
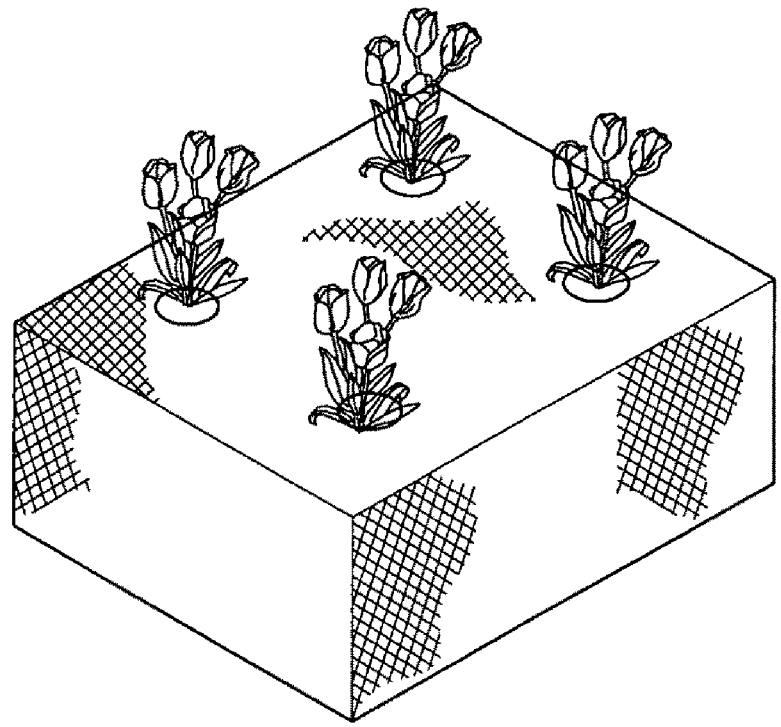
【Figure 7b】
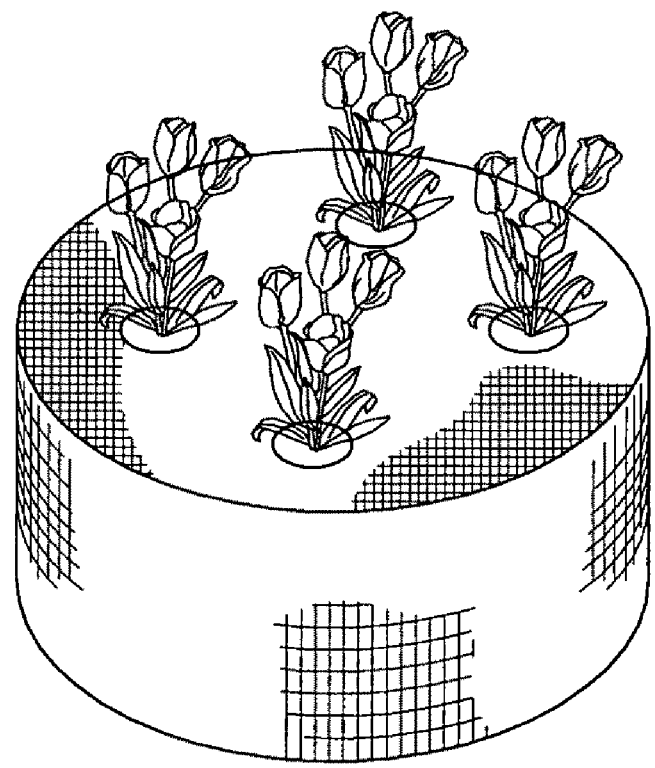

【Figure 8】
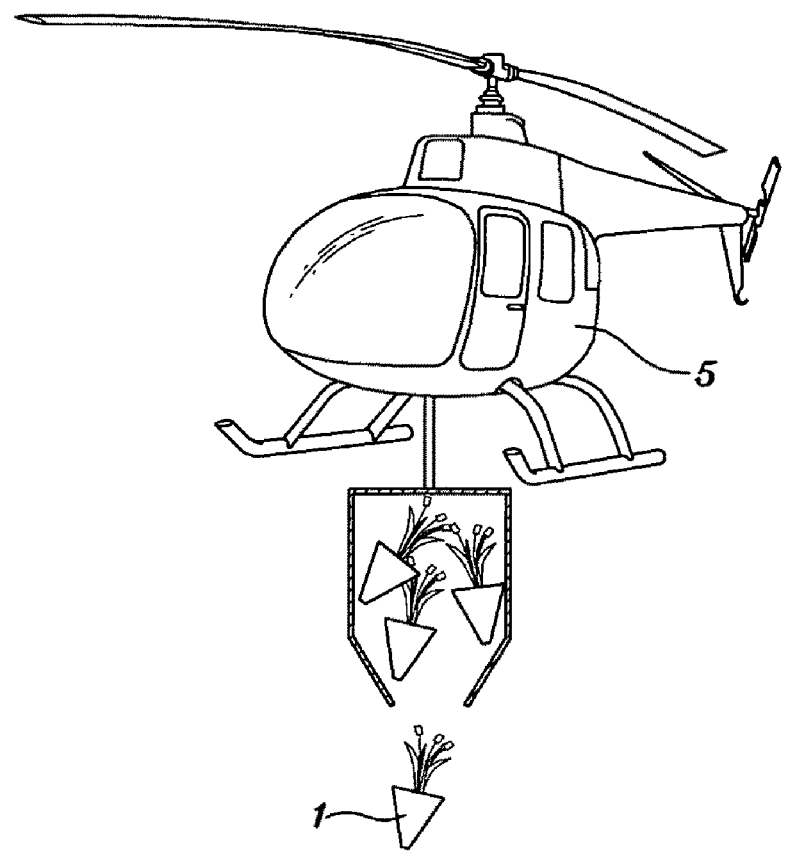
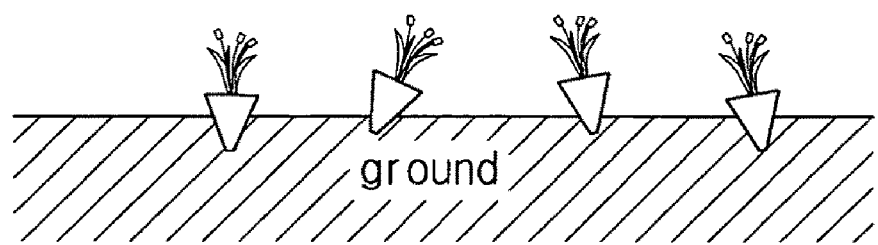

METHOD FOR THE AFFORESTATION OF THE RECALCITRANT LAND

TECHNICAL FIELD

The present invention relates to a method for the early afforestation of the recalcitrant land by aerial dropping of vegetation structures or containers containing plant seedlings onto the recalcitrant land.

BACKGROUND OF THE INVENTION

There has been several studies for afforestation of land that is difficult to cultivate. One such study that is directed to cultivation strategies for an inclined land implements the use of a net or concrete. For example, the Korean Patent No. 10-729417 has disclosed an afforestation structure composed of a net, and a soil layer.

The Korean Patent No. 10-661852 also disclosed a method for the afforestation of a slope surface of inclined ground without using a fiber net, or a concrete, in which a cultured soil was prepared by mixing with a fermentation solution and it was then applied to the surface of the inclined ground prior to application of the seeds.

The Korean Patent No. 10-542729 disclosed a method for afforestation using a block for reinforcing afforestation on a slope surface of inclined ground.

The Korean Patent No. 10-473540 disclosed a method for afforestation by the use of a fin shaped device containing soil and sand to prevent the loss of soil.

The Korean Patent No. 10-426129 disclosed a method for the afforestation of inclined ground in which inclined ground was covered with a wire net and then an artificial soil composition with the thickness of 20 cm was applied onto the inclined ground.

The aforementioned methods, although useful for the cultivation of inclined grounds, are not practical for the afforestation of other types of lands that are particularly recalcitrant for growing vegetations, and difficult to cultivate. The examples of these lands are, lands that have been subjected to fire, dune land, barren land, lands with a highly steep slopes, and bedrock land, among others.

The present invention solves this problem by providing methods for successful afforestation of a variety of difficult to cultivate and recalcitrant lands through the use of aerial afforestation processes that ensure correct positioning and continued survival of the seedlings on land with reduced labor power.

SUMMARY OF THE INVENTION

The invention as described and disclosed herein provides methods of afforestation of recalcitrant land.

According to one embodiment, the invention provides methods of afforestation of recalcitrant land comprising the steps of: a) preparing multiplicity of vegetation containers made of natural wood and having a thickness of 3-8 mm; b) growing plant seeds in a soil composition composed of sprouting promoter, rooting promoter, fertilizer and peat moss to obtain plant seedlings; c) placing said plant seedlings into said multiplicity of vegetation containers; and d) airdropping said multiplicity of vegetation containers containing said plant seedlings onto the recalcitrant land.

Afforestation as known in the art is a process by which a piece of land is cultivated into forming a forest or woodland. The recalcitrant land is a type of land that is particularly difficult to cultivate. The recalcitrant land comprises an inclined ground land, a land that has been subjected to fire, a dune land, a barren land, a steep sloped land, or a bedrock land, or a combination thereof.

The vegetation container can be of any shape or form so long it can be stably be placed in a target recalcitrant land. These shapes include, hexagonal, conical, round, square, cylindrical, regular triangle, isosceles triangle, polyhedron, and oval, among others.

In one embodiment, the vegetation container is made of natural wood or fiber.

In another embodiment, the seedling is grown for two months prior to be airdropped on land.

In yet another embodiment, the airdropping is achieved through planes or helicopters.

DESCRIPTION OF DRAWINGS

FIG. 1 is showing a custom-type conical wooden container in accordance with the preferred embodiment of the present invention.

FIG. 2 is showing the growth stages of seedlings prior to airdropping. FIG. 2a is showing the vegetation state of a coniferous tree. FIG. 2b is showing the vegetation state of a broadleaf tree.

FIGS. 3, 4 and 5a are showing the vegetation container made of natural fiber in three different shapes, cylindrical, oval, and hexagonal, respectively.

FIGS. 5b and 6 are showing the vegetation containers made of wood in two different shapes rectangular and conical, respectively.

FIGS. 7a and 7b are showing vegetation containers for aerial dropping in which a number of plant seed can be sown and grown in several cavities within one vegetation container.

FIG. 8 is showing the aerial dropping of the vegetation containers onto the recalcitrant land.

DETAILED DESCRIPTION OF THE INVENTION

The invention as described and disclosed herein provides methods for afforestation of a recalcitrant land that is difficult to cultivate using aerial deposition of the seedlings onto the land. The vegetation containers can be in any shape or form so long as it can successfully be placed onto the target recalcitrant land. The seeds are grown in a vegetation container that contains a rooting promoter and soil in a green house or outdoors. When the seedlings achieve proper growth, they are then deposited on the recalcitrant land by the use of an airplane or a helicopter.

The present invention has many applications, including, by way or example and not limitation, landscape architecture.

FIGS. 1 to 6 are preferred illustrative drawings for the vegetation containers to use in the afforestation of the recalcitrant land.

FIG. 1 is showing a conical wooden container as a preferred vegetation structure of the present invention. Preferably, the container has 30~90 mm of diameter and 100~200 mm of length, and most preferably, the container has 60 mm of diameter and 150 mm of length.

FIGS. 2a and 2b are showing a coniferous tree (2) or a broadleaf tree (20) grown in the vegetation container (1) suitable for aerial dropping onto the recalcitrant land with an airplane in which the vegetation soil (3) contains the artificial soil, fertilizer, seed and the rooting promoter and seed is sprouted, rooted and hardened in the vegetation container (1).

FIG. 7 is showing a vegetation container of hexahedron type (FIG. 7a) and cylindrical type (FIG. 7b) made by natural fiber suitable for aerial dropping, in which a number of plant seed is sown, and grown therein, and then the grown plant is vegetated in the container.

FIG. 8 is showing application of the vegetation container onto the recalcitrant land using a helicopter (5).

In one embodiment, the wooden container of the present invention preferably has 3~8 mm of thickness, and most preferably has 5 mm of thickness based on two months in both of a coniferous tree and a broadleaf tree in consideration of time for taking root through the wooden container.

In another embodiment of the present invention, the soil composition for the vegetation which is the growing medium of the plant seed, is an artificial soil, preferably peat moss.

In yet another embodiment, a rooting promoter for the plant seed suitable for a coniferous tree and/or a broadleaf tree in an amount of 0.1% w/w of the artificial soil is used.

The vegetation container of the present invention, for example the conical wooden structure, as shown in FIG. 7, is durable and resistant to fracture when being aerially dropped onto the recalcitrant land. In one embodiment, the probability that the vegetation container of the present invention will be broken on dropping at 100 m of height from the ground, is below 0.01%.

According to one embodiment, the vegetation container of the invention is a conical wooden structure that includes sand bag therein the container. Such conical vegetation containers are preferred for the afforestation of the inclined ground, the dune ground or the tropical rain forest having much of solid waste compost therein.

Vegetation containers of the conical sand bag type can be prepared with natural fiber such as cotton, hemp, core from palm.

Referring to FIG. 4, the opening of the structure (1), in which a plant is grown by sowing seed into soil with fertilizer, should be tightly tied with a rope (4) to prevent the seedlings from spilling off the soil once dropped from the plane and upon impacting the ground.

The vegetation container of the present invention is suitable for applying to the recalcitrant lands such as the bedrock ground of rocky mountain or the hill ground on which the structure can be easily destroyed on direct aerial dropping.

Roots of the vegetated plant secrete a material capable of dissolving minerals in the rock. Plant root hair cells physically pass through the dissolved mineral in the rock to take root in the rock.

The structure of natural fiber (1) can be preferred to prepare with hemp thread having thickness capable of preventing from slipping in order to keep away from rolling over the bedrock of rocky mountain.

The vegetation container shown in FIG. 4 is one of embodiment of the present invention suitable for afforestation of grounds in which a wood fire has been occurred extensively. Since the vegetation of the fire extinguished ground is destroyed all at once, it is preferred that the custom-made vegetation containers be prepared by weaving natural fiber in order to early secure sod and have the plane bottom as shown in FIG. 4. Another advantage of having a vegetation container with a plane bottom is its ability to resist rolling.

The vegetation container made by natural fiber as shown in FIG. 5 is suitable for applying to the steep slope ground or the ground which is inclined, for example, for the construction of a new road, such as a expressway. Such vegetation container is preferably made by natural fiber such as cotton or hemp, and most preferably has the bottom and the three side of regular triangle or isosceles triangle type.

In another embodiment, the vegetation container has a polyhedron structure in which four faces are formed and can be easily landed on the ground without sliding and hence minimizing the damage to the plant when aerially dropped.

In yet another embodiment, the vegetation container as shown in FIG. 5b has a structure made of wood with a regular or rectangle polyhedron shape, which are particularly useful in afforestation of the dune ground, the inclined ground, or the bedrock because of its high friction coefficient due to the multi-side construction.

The vegetation containers made of wood having a cylinder conical shape is shown in FIG. 6. These containers can be applied to the afforestation of the dune ground or the solid waste compost ground. In addition, the vegetation container as shown in FIG. 6, can be applied to the afforestation of the barren ground or the bedrock ground.

In one embodiment, the fertilizer is a composite fertilizer in which nitrogen (N), phosphorous (P) and potassium (K) are mixed with micro elements. The fertilizer can be used in amount of less than 10% w/w of the soil composition.

FIG. 7 is showing vegetation containers with multiple cavities and having a regular hexahedron shape (FIG. 7a) and the cylindrical sack shape (FIG. 7b). Other preferred shapes include a lozenge or oval shape.

The invention claimed is:

1. A method of afforestation of recalcitrant land comprising the steps of:
   a) preparing multiplicity of vegetation containers made of natural wood in a regular or rectangle polyhedron shape and having a thickness of 3-8 mm;
   b) growing plant seeds in a soil composition composed of sprouting promoter, rooting promoter, fertilizer and peat moss to obtain plant seedlings;
   c) placing said plant seedlings into said multiplicity of vegetation containers; and
   d) airdropping said multiplicity of vegetation containers containing said plant seedlings onto the recalcitrant land.

2. The method according to claim 1 wherein said recalcitrant land comprises an inclined land, a land that has been subjected to fire, a dune land, a barren land, a steep sloped land, a bedrock land, or a combination thereof.

3. The method according to claim 1, wherein said vegetation container is conical.

4. The method according to claim 1, wherein said seedling is grown for two months prior to said airdropping.

5. The method according to claim 1 wherein said airdropping is achieved by planes or helicopters.

* * * * *